United States Patent
Luo et al.

(10) Patent No.: US 10,714,141 B2
(45) Date of Patent: Jul. 14, 2020

(54) METHOD FOR ACCESSING SHINGLED MAGNETIC RECORDING SMR DISK, AND SERVER

(71) Applicant: Huawei Technologies Co., Ltd., Shenzhen, Guangdong (CN)

(72) Inventors: Qingchao Luo, Shenzhen (CN); Lei Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 16/114,412

(22) Filed: Aug. 28, 2018

(65) Prior Publication Data
US 2018/0366158 A1    Dec. 20, 2018

Related U.S. Application Data

(63) Continuation of application No. PCT/CN2017/072992, filed on Feb. 6, 2017.

(30) Foreign Application Priority Data

Feb. 29, 2016   (CN) .......................... 2016 1 0113108

(51) Int. Cl.
*G11B 20/12*    (2006.01)
*G06F 3/06*    (2006.01)
(Continued)

(52) U.S. Cl.
CPC .......... *G11B 20/1217* (2013.01); *G06F 3/061* (2013.01); *G06F 3/0608* (2013.01);
(Continued)

(58) Field of Classification Search
CPC ...... G06F 3/0608; G06F 3/061; G06F 3/0638; G06F 3/0656; G06F 3/0676;
(Continued)

(56) References Cited

U.S. PATENT DOCUMENTS

| 9,269,376 | B1 | 2/2016 | Hess et al. |
| 9,864,529 | B1* | 1/2018 | Chen ..................... G06F 3/0619 |
| 2016/0224260 | A1* | 8/2016 | Bandic .................. G06F 3/0619 |

FOREIGN PATENT DOCUMENTS

| CN | 103595653 A | 2/2014 |
| CN | 103645969 A | 3/2014 |

(Continued)

OTHER PUBLICATIONS

Draft Proposed American National Standard, Project T13/BSR INCITS 537, Revision 05, Dec. 16, 2015, Information technology-Zoned Device ATA Command Set (ZAC), 86 pages.
(Continued)

*Primary Examiner* — Aracelis Ruiz
(74) *Attorney, Agent, or Firm* — Leydig, Voit & Mayer, Ltd.

(57) ABSTRACT

A method for accessing a shingled magnetic recording (SMR) disk is provided. The method includes: receiving, by the server, a data operation request, where the data operation request includes address information of target data; determining, according to the address information, a target storage zone in the SMR disk that corresponds to the target data; determining that there is write pointer information of the target storage zone in a cache, and obtaining the write pointer information from the cache, where the write pointer information is address information of latest stored data in the target storage zone; generating a data operation instruction according to the write pointer information and the address information of the target data, where the data operation instruction is used to perform an operation on the target data; and sending the data operation instruction to the SMR disk. Embodiments of the present disclosure are applied for a server to access an SMR disk.

13 Claims, 5 Drawing Sheets

(51) Int. Cl.
*G06F 12/0868* (2016.01)
*G11B 5/012* (2006.01)

(52) U.S. Cl.
CPC .......... *G06F 3/0638* (2013.01); *G06F 3/0656* (2013.01); *G06F 3/0676* (2013.01); *G06F 12/0868* (2013.01); *G11B 5/012* (2013.01); *G11B 2020/1238* (2013.01)

(58) Field of Classification Search
CPC ............ G06F 12/0868; G11B 20/1217; G11B 20/1238; G11B 5/012
See application file for complete search history.

(56) References Cited

FOREIGN PATENT DOCUMENTS

| | | |
|---|---|---|
| CN | 104636266 A | 5/2015 |
| CN | 105808163 A | 7/2016 |

OTHER PUBLICATIONS

Working Draft American National Standard, Project T10/BSR INCITS 536, Revision 1, May 8, 2014, Information technology-Zoned Block Commands (ZBC), 46 pages.

\* cited by examiner

METHOD FOR ACCESSING SHINGLED MAGNETIC RECORDING SMR DISK, AND SERVER

CROSS-REFERENCE TO RELATED APPLICATIONS

This application is a continuation of International Application No. PCT/CN2017/072992, filed on Feb. 6, 2017, which claims priority to Chinese Patent Application No. 201610113108.0, filed on Feb. 29, 2016. The disclosures of the aforementioned applications are hereby incorporated by reference in their entireties.

TECHNICAL FIELD

The present application relates to the storage field, and in particular, to a method for accessing a shingled magnetic recording SMR disk and a server.

BACKGROUND

The shingled magnetic recording (SMR) technology is a hard disk storage technology. When data is sequentially written into an SMR disk, a distance between magnetic tracks in which a write head performs writing is narrower, so that data recording density increases, and a hard disk capacity increases accordingly.

According to definition in a current standard, when accessing an SMR disk, a server needs to support five zone instructions. The five instructions are respectively an open zone instruction used to open a storage zone, a finish zone instruction used to indicate a read/write operation success, a close zone instruction used to close a storage zone, a report zone instruction used to obtain a write pointer (WP), and a reset write pointer instruction used to delete data from a storage zone. When a zone on the SMR is read/written, a WP needs to be first obtained by using the report zone instruction. Then, data read/write is performed by using the open zone instruction. After data is fully written, the zone may be closed by using the finish zone instruction and the close zone instruction. If the data in the zone needs to be deleted, the reset write pointer instruction may be used.

According to a feature of an SMR disk that sequential write needs to be performed in a zone, before reading/writing data in a zone each time, a server needs to first obtain a WP of the zone, and the WP is an address of data currently stored in the zone. After obtaining the WP, the server can encapsulate an operation instruction to perform a data operation on the zone. In the prior art, when performing a data operation on a zone each time, a server needs to send an open zone instruction and a report zone instruction to an SMR disk to obtain a WP of the zone. Consequently, efficiency of accessing the SMR disk by the server is low.

SUMMARY

An objective of the present disclosure is to provide a method for accessing a shingled magnetic recording SMR disk and a server, so as to resolve a technical problem that efficiency of accessing an SMR disk by a server is low.

To achieve the foregoing objective, the following technical solutions are used in the present disclosure:

According to a first aspect, a method for accessing a shingled magnetic recording SMR disk is provided, including: receiving, by a server, a data operation request, where the data operation request includes address information of target data; determining, by the server according to the address information, a target storage zone that is in the SMR disk and that is corresponding to the target data; determining, by the server, that there is write pointer information of the target storage zone in a cache, and obtaining the write pointer information from the cache, where the write pointer information is address information of latest stored data in the target storage zone; generating, by the server, a data operation instruction according to the write pointer information and the address information of the target data, where the data operation instruction is used to perform an operation on the target data; and sending, by the server, the data operation instruction to the SMR disk.

In the first aspect of the present disclosure, the server uses the cache to store write pointer information of a storage zone in the SMR disk, and the server does not need to send, before accessing the SMR disk each time, an open zone instruction and a report zone instruction to obtain node information, so that efficiency of accessing the SMR disk by the server is improved.

With reference to the first aspect, in a first possible implementation of the first aspect, the method further includes: when the server determines that there is no write pointer information of the target storage zone in the cache, sending, by the server to the SMR disk, an open zone instruction used to open the target storage zone and a report zone instruction used to obtain the write pointer information of the target storage zone; receiving, by the server, the write pointer information that is of the target storage zone and that is sent by the SMR disk; and storing, by the server, the write pointer information into the cache. The cache has an upper cache limit. When a quantity of cached records in the cache has reached an upper limit value, the server may mark the write pointer information in the cache as invalid and remove the write pointer information. Therefore, when the server reads/writes data next time, there may be no write pointer information of the target storage zone in the cache. In this case, the server may re-obtain, for caching, the write pointer information from the target storage zone in the SMR disk.

With reference to the first aspect or the first possible implementation of the first aspect, in a second possible implementation of the first aspect, the data operation instruction is used to read the target data stored in the target storage zone; and after the obtaining, by the server, the write pointer information, the method further includes: determining, by the server, that an address of the target data does not exceed the write pointer. According to a write feature of the SMR disk, data needs to be sequentially written. Therefore, the write pointer of the target storage zone is a maximum address of data stored in the target storage zone. Therefore, to ensure correct data reading, after obtaining the write pointer information, the server may determine that the address of the target data does not exceed the write pointer.

With reference to the first aspect or the first possible implementation of the first aspect, in a third possible implementation of the first aspect, the data operation instruction is used to write the target data into the target storage zone; and after the obtaining, by the server, the write pointer information, the method further includes: determining, by the server, that an address of the target data is greater than the write pointer and contiguous with the write pointer. According to a write feature of the SMR disk, data needs to be sequentially written, that is, an address of newly written data needs to be contiguous with an address of data that has been stored in the SMR disk. Therefore, to ensure correct data writing, after obtaining the write pointer information, the server may determine that the address of the target data is greater than the write pointer and contiguous with the write pointer.

With reference to any one of the first aspect or the possible implementations of the first aspect, in a fourth possible implementation of the first aspect, after the sending, by the server, the data operation instruction to the SMR disk, the method further includes: receiving, by the server, an operation success message sent by the SMR disk, where the operation success message includes information about a new write pointer of the target storage zone; and storing, by the server, the information about the new write pointer of the target storage zone into the cache. For data that is newly written into the SMR disk, an address of the newly written data is the write pointer of the SMR disk. Therefore, after writing the new data into the SMR disk, the server may obtain the information about the new write pointer for caching.

According to a second aspect, a server is provided, including: a receiving unit, configured to receive a data operation request, where the data operation request includes address information of target data; a determining unit, configured to determine, according to the address information, a target storage zone that is in the SMR disk and that is corresponding to the target data; a cache, configured to store write pointer information of a storage zone in the SMR disk; an obtaining unit, configured to: determine that there is write pointer information of the target storage zone in the cache, and obtain the write pointer information from the cache, where the write pointer information is address information of latest stored data in the target storage zone; a generation unit, configured to generate a data operation instruction according to the write pointer information and the address information of the target data, where the data operation instruction is used to perform an operation on the target data; and a sending unit, configured to send the data operation instruction to the SMR disk.

With reference to the second aspect, in a first possible implementation of the second aspect, the sending unit is further configured to: when the determining unit determines that there is no write pointer information of the target storage zone in the cache, send, to the SMR disk, an open zone instruction used to open the target storage zone and a report zone instruction used to obtain the write pointer information of the target storage zone; and the receiving unit is further configured to: receive the write pointer information that is of the target storage zone and that is sent by the SMR disk, and store the write pointer information into the cache.

With reference to the second aspect or the first possible implementation of the second aspect, in a second possible implementation of the second aspect, the data operation instruction is used to read the target data stored in the target storage zone; and the determining unit is further configured to determine that an address of the target data does not exceed the write pointer.

With reference to the second aspect or the first possible implementation of the second aspect, in a third possible implementation of the second aspect, the data operation instruction is used to write the target data into the target storage zone; and the determining unit is further configured to determine that an address of the target data is greater than the write pointer and contiguous with the write pointer.

With reference to anyone of the second aspect or the possible implementations of the second aspect, in a fourth possible implementation of the second aspect, the receiving unit is further configured to: receive an operation success message sent by the SMR disk, where the operation success message includes information about a new write pointer of the target storage zone; and store the information about the new write pointer of the target storage zone into the cache.

With reference to anyone of the second aspect or the possible implementations of the second aspect, in a fifth possible implementation of the second aspect, the server runs a Linux system. It should be noted that in the prior art, there is still no SMR operation method that is based on a small computer system interface (SCSI) in the Linux system. The server provided in the present disclosure runs the Linux system. All the foregoing function units may be located at an upper level included in a multilevel architecture of a Linux SCSI subsystem. A conventional interface used in the Linux system is not changed when a function module is added to the upper level. Therefore, the server can further use another type of hard disk in addition to the SMR disk, so that compatibility of the server that runs the Linux system is improved.

According to a third aspect, a server is provided, where the server includes a processor, a communications interface, a cache, and a communications bus; the processor, the communications interface, and the cache communicate with each other by using the communications bus; and the processor is configured to perform the method according to any one of the first aspect or the possible implementations of the first aspect.

With reference to the third aspect, in a first possible implementation of the third aspect, the server runs a Linux system.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

To enable a person of ordinary skill in the art to more easily understand the technical solutions provided in the present disclosure, the following first briefly describes an SMR disk.

There are three types of SMR disks: drive managed, host aware, and host managed. The drive managed SMR disk uses an internal remapping technology to change all external random writes to sequential writes, so as to behave like a conventional hard disk, and an upper-layer application can use the drive managed SMR disk without making a modification. For the host managed SMR disk, the hard disk is divided into different storage zones, and for writing in the zone, a sequential write principle is followed. If an application does not assume a sequential write manner, the host managed SMR disk returns an error. That is, this type of hard disk requires an upper-layer application to organize data in the sequential write manner, and if the upper-layer application uses a random write manner, the upper-layer application cannot use the hard disk. The host aware SMR disk is a compromise between the drive managed SMR disk and the host aware SMR disk. For the host aware SMR disk, the hard disk is also divided into different zones, but random read/write access inside the zone is supported.

In the three types of SMR disks in the prior art, when data access is performed, there is a problem that efficiency of accessing the SMR disk by a server is low.

Further, to make the objective, technical solutions, and advantages of the embodiments of the present disclosure clearer, the following describes the technical solutions of the embodiments of the present disclosure with reference to the accompanying drawings in the embodiments of the present disclosure.

Figure 1:
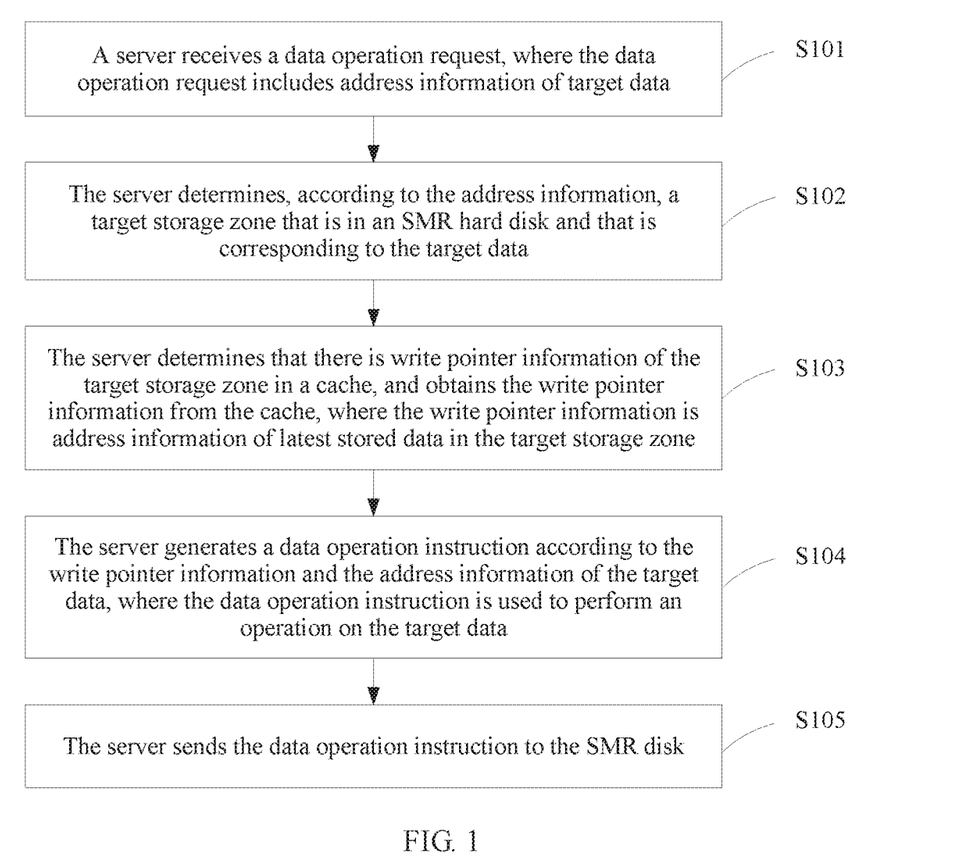
FIG. 1 is a schematic flowchart of a method for accessing a shingled magnetic recording SMR disk according to an embodiment of the present disclosure.

An embodiment of the present disclosure provides a method for accessing a shingled magnetic recording SMR disk. As shown in FIG. 1, the method includes the following steps.

S101. A server receives a data operation request, where the data operation request includes address information of target data.

Specifically, the data operation request may be a data read request, or may be a data write request. The address information of the target data may be a logical block address (LBA) of the target data.

In addition, it should be noted that the data operation request may be sent by an application program run by the server, or may be sent by another device connected to the server.

S102. The server determines, according to the address information, a target storage zone that is in the SMR disk and that is corresponding to the target data.

Specifically, if the data operation request described in step S101 is a data read request, the target storage zone that is in the SMR disk and that is corresponding to the target data is a storage zone in which the target data is stored; or if the data operation request described in step S101 is a data write request, the target storage zone that is in the SMR disk and that is corresponding to the target data is a storage zone into which the target data is to be written.

It should be noted that a size of a storage zone that is in the SMR disk and that is obtained by means of division is fixed. For example, for an SMR disk of a size of 10 TB (terabyte), a size of each zone in the SMR disk is 256 MB (megabyte). In this case, a quotient obtained by the server by dividing the size of the zone in the SMR disk by the LBA of the target data is a number of the target storage zone, and an obtained remainder is a storage address of the target data in the target storage zone.

S103. The server determines that there is write pointer information of the target storage zone in a cache, and obtains the write pointer information from the cache, where the write pointer information is address information of latest stored data in the target storage zone.

It should be noted that because the SMR disk requires data to be sequentially written, before performing a data write operation on a specific zone, the server needs to know an address of latest data currently stored in the zone, so that new target data continues to be sequentially written after the address.

In the technical solution provided in this embodiment of the present disclosure, the cache of the server is used to store write pointer information of a storage zone in the SMR disk, and the server does not need to send, before accessing the SMR disk each time, an open zone instruction and a report zone instruction to obtain node information, so that efficiency of accessing the SMR disk by the server is improved.

S104. The server generates a data operation instruction according to the write pointer information and the address information of the target data, where the data operation instruction is used to perform an operation on the target data.

The data operation instruction needs to be encapsulated according to a hard disk interface technology used by the server. It should be noted that three types of hard disk interface technologies can be used on the server: small computer system interface (SCSI), serial attached SCSI (SAS), and Serial Advanced Technology Attachment (SATA). An existing SMR disk supports a SAS interface and a SATA interface that are respectively corresponding to the Zoned Block Instruction (ZBCt) standard and the Zoned Device ATA Instructions (ZAC) standard. The ZBC standard describes in detail how to process a write operation at a specific location in the SMR disk. In addition, randomly reading written data is allowed.

In a possible implementation of this embodiment of the present disclosure, the server may be a server that runs a Linux system.

It should be noted that a multilevel architecture of a Linux SCSI subsystem includes an upper level, a middle level, and a lower level. The upper level represents a highest-level interface in a kernel. The upper level includes a group of drives. The middle level is a common service layer for the upper level and the lower level. The middle level provides many functions that can be used by an upper-level drive and a lower-level drive, and therefore, can serve as a connection level between the two levels. In specific implementation, the server processes SCSI instruction encapsulation by using the mid level, and implements processing for different types of SCSI devices by using an upper-level drive.

In this embodiment of the present disclosure, a function module may be added to the upper level, so that the server can access the SMR disk. A conventional interface used in the Linux system is not changed when the function module is added to the upper level. Therefore, the server can further use another type of hard disk in addition to the SMR disk, so that compatibility of the server that runs the Linux system is improved.

S105. The server sends the data operation instruction to the SMR disk.

The data operation instruction may be a data write instruction, which is used to write the target data into the target storage zone; or the data operation instruction may be a data read instruction, which is used to read the target data stored in the target storage zone.

Figure 2:
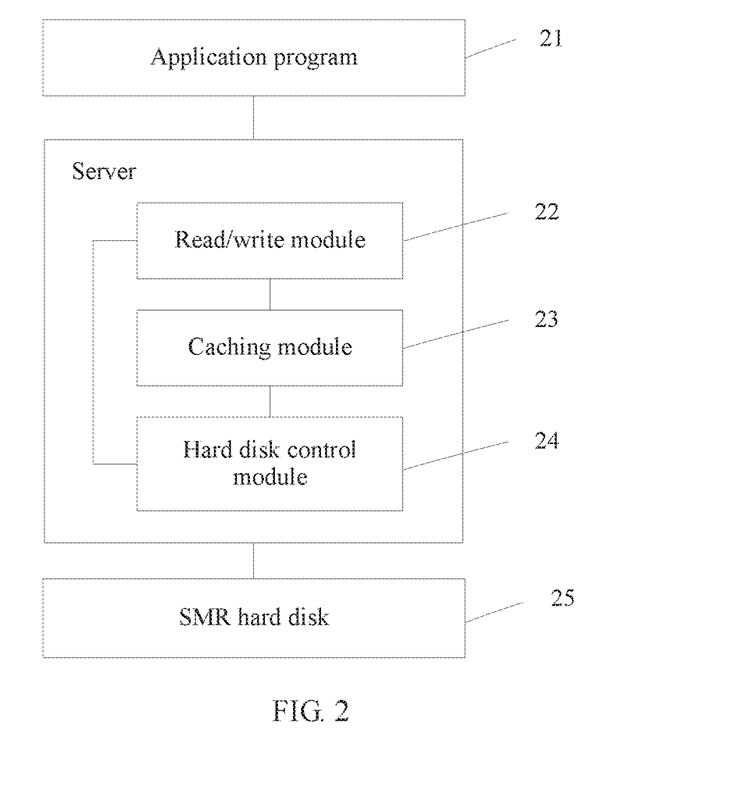
FIG. 2 is a schematic structural diagram of a server according to an embodiment of the present disclosure.
Figure 3A:
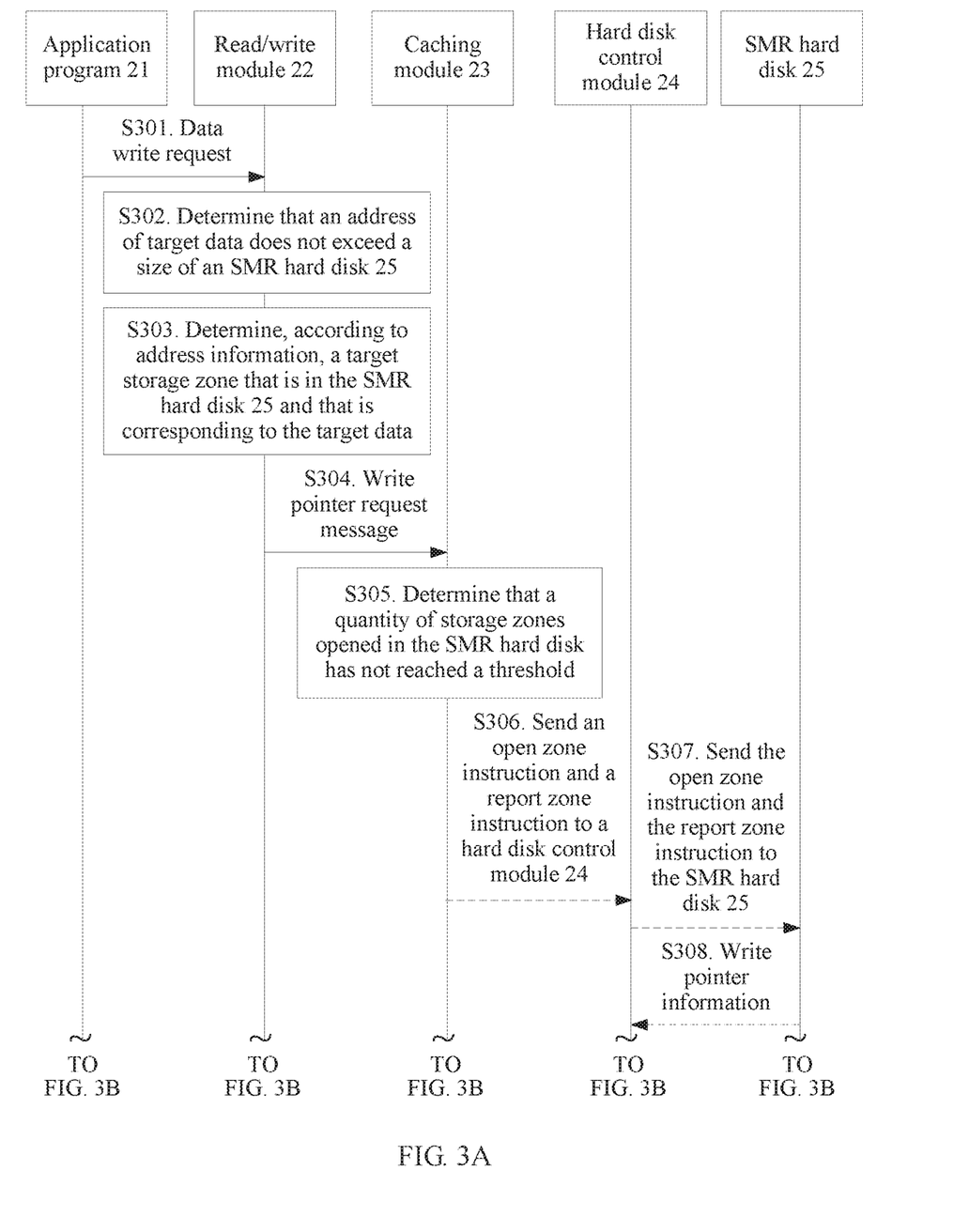
FIG. 3A and FIG. 3B are a schematic flowchart of a method, based on the server shown in FIG. 2, for accessing a shingled magnetic recording SMR disk.
Figure 3B:
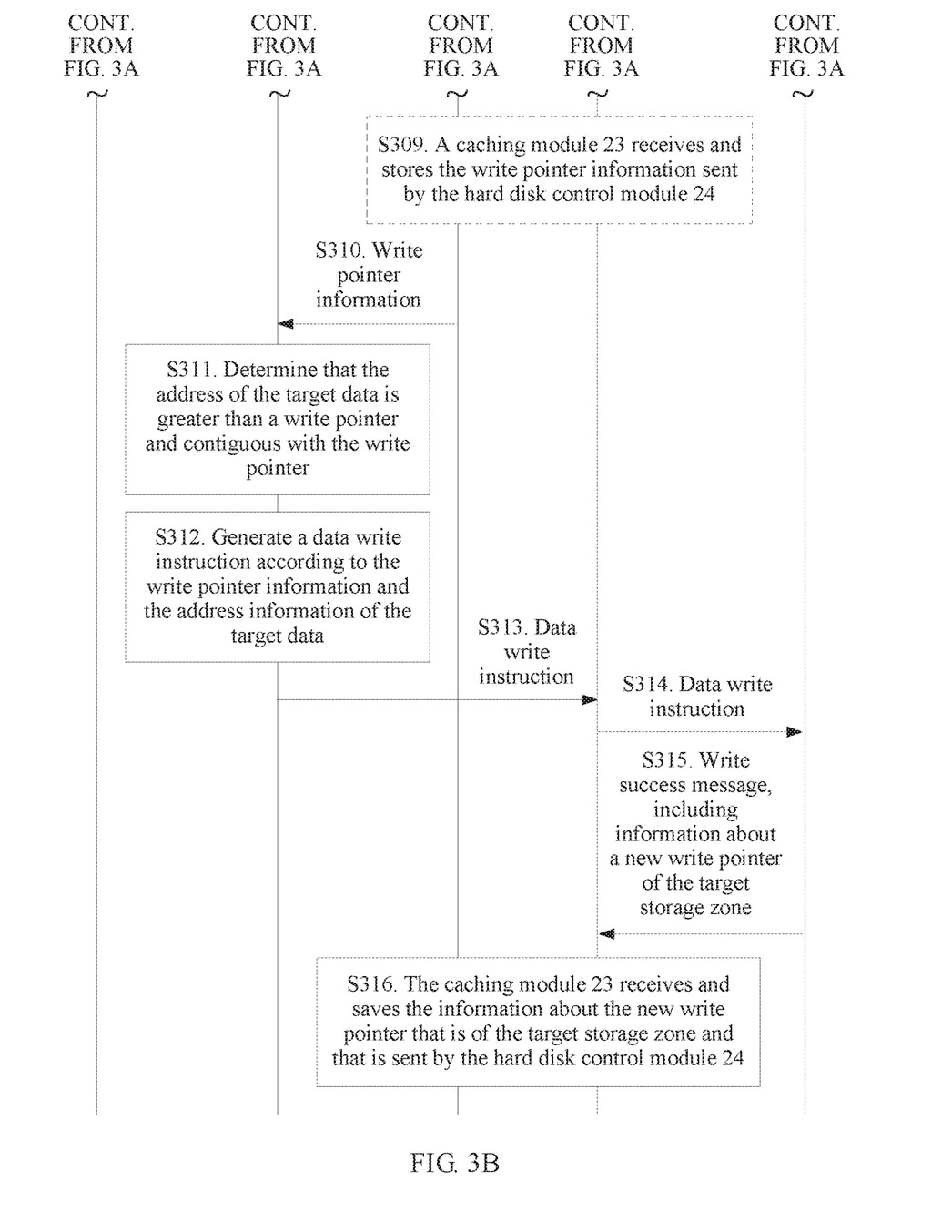

It should be noted that, for ease of description, that operations of accessing the SMR disk are all executed by the server is described in the method embodiment shown in FIG. 1. However, a person skilled in the art should understand that, in specific implementation, the server may be divided into different function modules, and all the function modules work together to complete the operations of accessing the SMR disk. For example, for a server shown in FIG. 2, the server runs an application program 21, and includes a read/write module 22, a caching module 23, and a hard disk control module 24. The server is connected to an SMR disk 25. To make a person skilled in the art better understand the technical solution provided in the present disclosure, the following describes in detail, with reference to the server shown in FIG. 2, a method for accessing an SMR disk according to an embodiment of the present disclosure. As shown in FIG. 3A and FIG. 3B, the method includes the following steps.

S301. The application program 21 sends a data write request to the read/write module 22, where the data write request includes to-be-written target data and address information of the target data.

The method embodiment shown in FIG. 3A and FIG. 3B is merely an example for description. In another possible implementation of this embodiment of the present disclosure, alternatively, the server may receive a data write request sent by another device connected to the server. This is not limited in the present disclosure.

S302. The read/write module 22 determines that an address of the target data does not exceed a size of the SMR disk 25.

It should be noted that if the address of the target data exceeds the size of the SMR disk 25, the read/write module 22 may return an error to the application program 21.

S303. The read/write module 22 determines, according to the address information, a target storage zone that is in the SMR disk 25 and that is corresponding to the target data.

For details, refer to the description of step S102 in the method embodiment shown in FIG. 1. Details are not described herein again.

S304. The read/write module 22 sends a write pointer request message to the caching module 23 to obtain write pointer information of the target storage zone.

Further, if the caching module 23 caches the write pointer information of the target storage zone, step S310 is performed; or if the caching module 23 does not cache write pointer information of the target storage zone, step S305 to step S310 are performed.

S305. The caching module 23 determines that a quantity of storage zones opened in the SMR disk has not reached a threshold.

It should be noted that a quantity of storage zones opened in the SMR disk at a same moment is fixed. Therefore, before obtaining write pointer information of the storage zone from the SMR disk, the caching module 23 may determine whether the quantity of storage zones opened in the SMR disk has reached the threshold; and waits if the quantity has reached the threshold, or performs step S306 if the quantity has not reached the threshold.

S306. The caching module 23 sends an open zone instruction and a report zone instruction to the hard disk control module 24.

It should be noted that the open zone instruction and the report zone instruction are instructions defined in a prior standard, and are not described in detail in this embodiment of the present disclosure.

S307. The hard disk control module 24 sends the open zone instruction and the report zone instruction to the SMR disk 25.

S308. The hard disk control module 24 receives the write pointer information that is of the target storage zone and that is sent by the SMR disk 25.

S309. The caching module 23 receives and stores the write pointer information sent by the hard disk control module 24.

S310. The caching module 23 sends the write pointer information to the read/write module 22.

S311. The read/write module 22 determines that the address of the target data is greater than the write pointer and contiguous with the write pointer.

It should be noted that if the address of the target data is less than the write pointer or not contiguous with the write pointer, the read/write module 22 may return an error to the application program 21.

S312. The read/write module 22 generates a data write instruction according to the write pointer information and the address information of the target data.

S313. The read/write module 22 sends the data write instruction to the hard disk control module 24.

S314. The hard disk control module 24 sends the data write instruction to the SMR disk 25.

S315. The hard disk control module 24 receives a write success message sent by the SMR disk 25, where the write success message includes information about a new write pointer of the target storage zone.

S316. The caching module 23 receives and stores the information about the new write pointer that is of the target storage zone and that is sent by the hard disk control module 24.

For brief description, the foregoing method embodiments are all described as a combination of a series of actions. However, a person skilled in the art should appreciate that the present disclosure is not limited to the described action sequence. In addition, a person skilled in the art should appreciate that all the embodiments described in this specification are embodiments, and the actions involved are not necessarily mandatory to the present disclosure.

The method embodiment shown in FIG. 3A and FIG. 3B is a flowchart of a method for writing data into the SMR disk by the server. When the server reads data from the SMR disk, a process of obtaining the write pointer information of the target storage zone is the same as a data write procedure. In a process of reading the data from the SMR disk, after obtaining the write pointer information of the target storage zone, the server may determine whether the address of the target data exceeds the write pointer of the target storage zone; and return an error to the application program if the address exceeds the write pointer.

According to the foregoing method embodiment, a cache of the server stores the write pointer information of the storage zone in the SMR disk, and the server does not need to send, before accessing the SMR disk each time, the open zone instruction and the report zone instruction to obtain node information, so that efficiency of accessing the SMR disk by the server is improved.

It should be noted that cached records of, for example, data read requests, data write requests, and open zone instructions, may be further added to the caching module 23 according to an actual requirement. In addition, when determining that a quantity of cached records in the caching module 23 has reached an upper limit value of the caching module, the server may mark a cached record in the caching module 23 as invalid and remove the invalid cached record from the caching module 23. In addition, when the server restarts, the caching module restarts, or the like, the invalid cached record in the caching module 23 may be removed. This can be specifically set according to an actual requirement, and is not limited in the present disclosure.

When accessing the SMR disk, the server needs to send a zone-based instruction. Therefore, the hard disk control module 24 may encapsulate zone-based SCSI instructions, for example, an open zone instruction, a finish zone instruction, a close zone instruction, a report zone instruction, and a reset write pointer instruction that are defined in the prior standard, or obtain another instruction by means of extension according to the standard. The hard disk control module 24 may further perform parsing processing based on a SCSI of the SMR disk, for example, a zone-specific error code definition and error processing function of the SMR disk.

The foregoing method embodiment is merely an example for description. The function module division of the server shown in FIG. 2 is merely a possible implementation and may be other division in actual implementation. For example, the server is divided into a processing module and a hard disk control module, where the processing module is configured to implement a function of the read/write module and that of the caching module.

Figure 4:
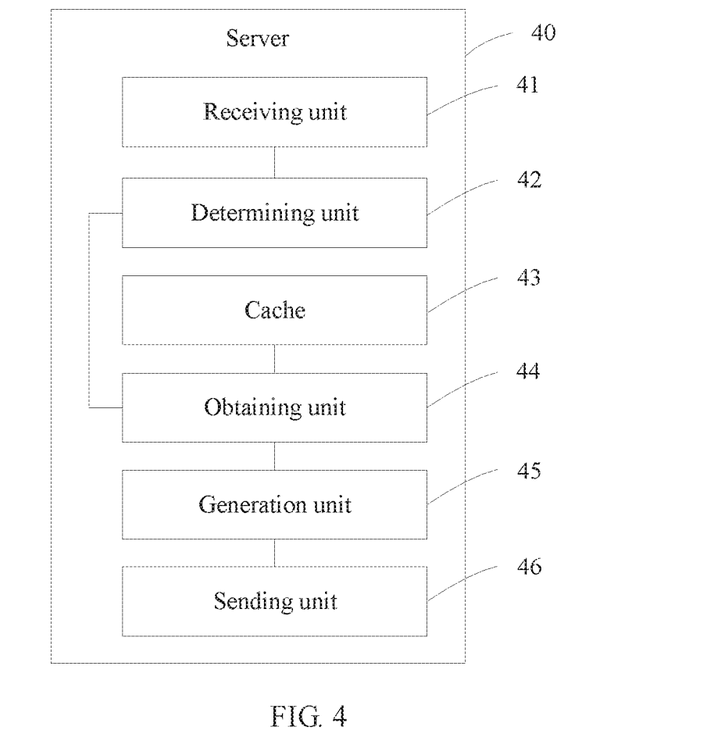
FIG. 4 is a schematic structural diagram of another server according to an embodiment of the present disclosure.

An embodiment of the present disclosure further provides a server 40 to implement related method steps in the foregoing method embodiments. As shown in FIG. 4, the server 40 includes:

a receiving unit 41, configured to receive a data operation request, where the data operation request includes address information of target data;

a determining unit 42, configured to determine, according to the address information, a target storage zone that is in the SMR disk and that is corresponding to the target data;

a cache 43, configured to store write pointer information of a storage zone in the SMR disk;

an obtaining unit 44, configured to: determine that there is write pointer information of the target storage zone in the cache, and obtain the write pointer information from the cache, where the write pointer information is address information of latest stored data in the target storage zone;

a generation unit 45, configured to generate a data operation instruction according to the write pointer information and the address information of the target data, where the data operation instruction is used to perform an operation on the target data; and a sending unit 46, configured to send the data operation instruction to the SMR disk.

According to the foregoing server, the cache of the server stores the write pointer information of the storage zone in the SMR disk, and the server does not need to send, before accessing the SMR disk each time, an open zone instruction and a report zone instruction to obtain node information, so that efficiency of accessing the SMR disk by the server is improved.

Optionally, the sending unit 46 is further configured to: when the determining unit 42 determines that there is no write pointer information of the target storage zone in the cache, send, to the SMR disk, an open zone instruction used to open the target storage zone and a report zone instruction used to obtain the write pointer information of the target storage zone.

The receiving unit 41 is further configured to: receive the write pointer information that is of the target storage zone and that is sent by the SMR disk, and store the write pointer information into the cache.

Optionally, the data operation instruction is used to read the target data stored in the target storage zone; and the determining unit 42 is further configured to determine that an address of the target data does not exceed the write pointer.

Optionally, the data operation instruction is used to write the target data into the target storage zone; and the determining unit 42 is further configured to determine that an address of the target data is greater than the write pointer and contiguous with the write pointer.

Optionally, the receiving unit 41 is further configured to: receive an operation success message sent by the SMR disk, where the operation success message includes information about a new write pointer of the target storage zone; and store the information about the new write pointer of the target storage zone into the cache.

Optionally, the server runs a Linux system. All the foregoing function units may be located at an upper level upper level included in a multilevel architecture of a Linux SCSI subsystem. A conventional interface used in the Linux system is not changed when a function module is added to the upper level. Therefore, the server can further use another type of hard disk in addition to the SMR disk, so that compatibility of the server that runs the Linux system is improved.

It should be noted that the unit division of the server 40 is merely logical function division and may be other division in actual implementation. For example, the determining unit 42 and the generation unit 45 may be integrated into one processing unit. In addition, the foregoing function units may be physically implemented in multiple manners. For example, the determining unit 42 may be specifically a central processing unit, or may be an application-specific integrated circuit (ASIC).

It may be clearly understood by a person skilled in the art that, for ease and brevity of description, for a detailed working process of the described storage controller, refer to a corresponding process in the foregoing method embodiments. Details are not described herein again.

Figure 5:
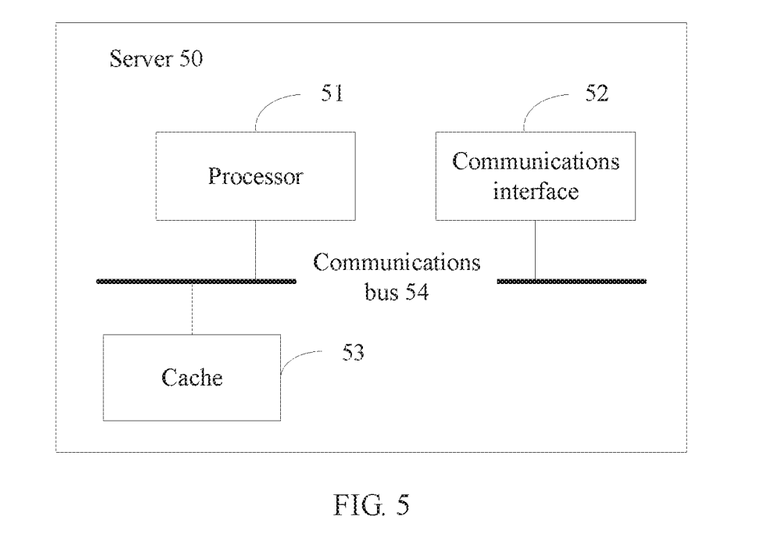
FIG. 5 is a schematic structural diagram of still another server according to an embodiment of the present disclosure.

An embodiment of the present disclosure further provides another server 50 to implement the foregoing method embodiments. As shown in FIG. 5, the server 50 includes a processor (processor) 51, a communications interface (Communications Interface) 52, a cache 53, and a communications bus 54. The processor 51, the communications interface 52, and the cache 53 communicate with each other by using the communications bus 54.

The processor 51 may be a multi-core central processing unit CPU, an application-specific integrated circuit ASIC (Application Specific Integrated Circuit), or one or more integrated circuits configured to implement this embodiment of the present disclosure.

The cache 53 is configured to store write pointer information of a storage zone included in the SMR disk.

The communications interface 52 is configured to implement connection and communication among these apparatuses.

The processor 51 is configured to perform the following operations:

receiving a data operation request, where the data operation request includes address information of target data;

determining, according to the address information, a target storage zone that is in the SMR disk and that is corresponding to the target data;

determining that there is write pointer information of the target storage zone in a cache, and obtaining the write pointer information from the cache, where the write pointer information is address information of latest stored data in the target storage zone;

generating a data operation instruction according to the write pointer information and the address information of the target data, where the data operation instruction is used to perform an operation on the target data; and sending the data operation instruction to the SMR disk.

Optionally, the operation further includes:

when determining that there is no write pointer information of the target storage zone in the cache, sending, to the SMR disk, an open zone instruction used to open the target storage zone and a report zone instruction used to obtain the write pointer information of the target storage zone;

receiving the write pointer information that is of the target storage zone and that is sent by the SMR disk; and storing the write pointer information into the cache.

Optionally, the data operation instruction is used to read the target data stored in the target storage zone.

After the obtaining the write pointer information, the operation further includes:

determining that an address of the target data does not exceed the write pointer.

Optionally, the data operation instruction is used to write the target data into the target storage zone.

After the obtaining the write pointer information, the operation further includes:

determining that an address of the target data is greater than the write pointer and contiguous with the write pointer.

Optionally, after the sending the data operation instruction to the SMR disk, the operation further includes:

receiving an operation success message sent by the SMR disk, where the operation success message includes information about a new write pointer of the target storage zone; and storing the information about the new write pointer of the target storage zone into the cache.

Optionally, the server 40 runs a Linux system.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections via some interfaces, apparatuses or units, and may be implemented in electronic, mechanical, or other forms.

The units described as separate parts may or may not be physically separate. Parts displayed as units may or may not be physical units, and may be located in one position or distributed on a plurality of network units. Some or all of the units may be selected according to actual requirements to achieve the objectives of the solutions of the embodiments.

In addition, function units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software function unit.

When the foregoing integrated unit is implemented in a form of a software function unit, the integrated unit may be stored in a computer-readable storage medium. The software function unit is stored in a storage medium and includes several instructions for instructing a computer device (which may be a personal computer, a server, a network device, or the like) to perform some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

Although some preferred embodiments of the present disclosure have been described, a person skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations of the present disclosure provided that they fall within the scope of protection defined by the following claims of the present disclosure and their equivalent technologies.

What is claimed is:

1. A method for accessing a shingled magnetic recording (SMR) hard disk, the method comprising:

receiving, by a server, a data operation request comprising address information of target data;

determining, by the server according to the address information, a target storage zone in the SMR hard disk that corresponds to the target data;

determining, by the server, whether there is write pointer information of the target storage zone in a cache of the server;

in response to determining that there is no write pointer information of the target storage zone in the cache, determining, by the server, whether a quantity of storage zones opened in the SMR hard disk has reached a threshold;

in response to determining that the quantity of storage zones opened in the SMR hard disk has not reached the threshold, sending, by the server, an open zone instruction and a report zone instruction to the SMR hard disk;

receiving, by the server, the write pointer information of the target storage zone and storing the write pointer information in the cache, wherein the write pointer information is address information of latest stored data in the target storage zone;

generating, by the server, a data operation instruction according to the write pointer information and the address information of the target data; and sending, by the server, the data operation instruction to the SMR hard disk for performing an operation on the target data.

2. The method according to claim 1, wherein:

the data operation instruction is for reading the target data stored in the target storage zone; and after receiving the write pointer information, the method further comprises: determining, by the server, whether the address of the target data exceeds a write pointer of the target storage zone.

3. The method according to claim 2, wherein after sending the data operation instruction to the SMR hard disk, the method further comprises:

receiving, by the server, an operation success message from the SMR hard disk, wherein the operation success message comprises information about a new write pointer of the target storage zone; and storing, by the server, the information about the new write pointer of the target storage zone into the cache.

4. The method according to claim 1, wherein:

the data operation instruction is for writing the target data into the target storage zone; and after receiving the write pointer information, the method further comprises: determining, by the server, whether the address of the target data is greater than a write pointer and contiguous with the write pointer.

5. The method according to claim 4, wherein after sending the data operation instruction to the SMR hard disk, the method further comprises:
receiving, by the server, an operation success message from the SMR hard disk, wherein the operation success message comprises information about a new write pointer of the target storage zone; and
storing, by the server, the information about the new write pointer of the target storage zone into the cache.

6. The method according to claim 1, wherein after sending the data operation instruction to the SMR hard disk, the method further comprises:
receiving, by the server, an operation success message from the SMR hard disk, wherein the operation success message comprises information about a new write pointer of the target storage zone; and
storing, by the server, the information about the new write pointer of the target storage zone into the cache.

7. The method according to claim 1, wherein the server runs a Linux system.

8. A server, comprising
a communications bus;
a cache coupled to the communications bus;
a communications interface coupled to the communications bus; and
a processor coupled to the communications bus and configured to:
receive a data operation request comprising address information of target data;
determine, according to the address information, a target zone in a shingled magnetic recording (SMR) hard disk that corresponds to the target data;
determine whether there is write pointer information of the target storage zone in the cache of the server;
in response to determining that there is no write pointer information of the target storage zone in the cache, determine whether a quantity of storage zones opened in the SMR hard disk has reached a threshold;
in response to determining that the quantity of storage zones opened in the SMR hard disk has not reached the threshold, send an open zone instruction and a report zone instruction to the SMR hard disk;
receive the write pointer information of the target storage zone and store the write pointer information in the cache, wherein the write pointer information is address information of latest stored data in the target storage zone;
generate a data operation instruction according to the write pointer information and the address information of the target data; and
send the data operation instruction to the SMR hard disk for performing an operation on the target data.

9. The server according to claim 8, wherein:
the data operation instruction is for reading the target data stored in the target storage zone; and
the processor is further configured to: after receiving the write pointer information, determine whether the address of the target data exceeds a write pointer of the target storage zone.

10. The server according to a claim 9, wherein the processor is further configured to:
after sending the data operation instruction to the SMR hard disk, receive an operation success message from the SMR hard disk, wherein the operation success message comprises information about a new write pointer of the target storage zone; and
store the information about the new write pointer of the target storage zone into the cache.

11. The server according to claim 8, wherein:
the data operation instruction is for writing the target data into the target storage zone; and
the processor is further configured to: after receiving the write pointer information, determine whether the address of the target data is greater than a write pointer and contiguous with the write pointer.

12. The server according to claim 11, wherein the processor is further configured to:
after sending the data operation instruction to the SMR hard disk, receive an operation success message from the SMR hard disk, wherein the operation success message comprises information about a new write pointer of the target storage zone; and
store the information about the new write pointer of the target storage zone into the cache.

13. The server according to claim 8, wherein the processor is further configured to:
after sending the data operation instruction to the SMR hard disk, receive an operation success message from the SMR hard disk, wherein the operation success message comprises information about a new write pointer of the target storage zone; and
store the information about the new write pointer of the target storage zone into the cache.

* * * * *

UNITED STATES PATENT AND TRADEMARK OFFICE
CERTIFICATE OF CORRECTION

PATENT NO. : 10,714,141 B2
APPLICATION NO. : 16/114412
DATED : July 14, 2020
INVENTOR(S) : Luo et al.

Page 1 of 1

It is certified that error appears in the above-identified patent and that said Letters Patent is hereby corrected as shown below:

In the Claims

Claim 10: Column 14, Line 13: "according to a claim 9" should read -- according to claim 9 --.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*